(12) United States Patent
Chin-Hou et al.

(10) Patent No.: US 6,442,050 B2
(45) Date of Patent: Aug. 27, 2002

(54) PROTECTION CIRCUIT AND METHOD FOR SWITCHING POWER SUPPLY

(75) Inventors: Chen Chin-Hou; Wang Kuo-Jung, both of Taipei (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 09/911,943

(22) Filed: Jul. 24, 2001

(30) Foreign Application Priority Data

Jul. 25, 2000 (TW) .......................................... 89114859 A

(51) Int. Cl.[7] .............................................. H02H 7/122
(52) U.S. Cl. ....................................... 363/56.11; 361/92
(58) Field of Search ........................... 363/21.05, 21.07, 363/21.08, 21.13, 21.15, 21.16, 56.11; 361/92, 18

(56) References Cited

U.S. PATENT DOCUMENTS 4,562,522 A * 12/1985 Adams et al. ............... 361/235
5,675,485 A * 10/1997 Seong ....................... 363/21.15
5,859,768 A *  1/1999 Hall et al. ..................... 361/90

* cited by examiner

*Primary Examiner*—Shawn Riley
(74) *Attorney, Agent, or Firm*—Volpe and Koenig, P.C.

(57) ABSTRACT

A protection circuit arranged in a switching power supply system for protecting the switching power supply system is provided. The protection circuit includes a detecting circuit electrically connected to a switching controller of the switching power supply system for providing a trigger signal when a supply voltage drops to an under-voltage level, and a protection circuit electrically connected to the detecting circuit for providing a signal to protect the switching power supply system when the detecting circuit provides the trigger signal to the protection circuit. A method for protecting an switching power supply system is provided. The method includes the steps of detecting that the reference voltage signal disappears when the supply voltage is smaller than a minimum of operating voltage and providing a trigger signal, and providing an protection to protect the switching power supply system in response to the trigger signal.

20 Claims, 4 Drawing Sheets

PROTECTION CIRCUIT AND METHOD FOR SWITCHING POWER SUPPLY

FIELD OF THE INVENTION

The present invention relates to a protection circuit and a method for protecting a switching power supply system, and especially to a protection circuit arranged in a switching power supply system for protecting the switching power supply system.

BACKGROUND OF THE INVENTION

FIG. 1 shows a protection circuit for a switching power supply according to prior art. Please refer to FIG. 1. A typical switching power supply system 1 utilizes a coupled feedback winding circuit 11 for powering the switching controller 2 of the switching power supply system 1. The switching controller 2 can be the industry standard 3842/3843 family of PWM controller. In case of an abnormal condition where the coupled feedback winding circuit 11 is unable to power the switching controller 2 (i.e. short circuit or overload on the output of the switching power supply system 1 or AC line voltage at a lower level), the switching controller 2 is shut down. However, the AC line voltage of the typical switching power supply system 1 keeps charging the capacitor 111 of the coupled feedback winding circuit 11 and thereby the switching controller 2 is unceasingly and alternately powered-on and powered-off It is therefore attempted by the applicant to deal with the above situation encountered with the prior art.

SUMMARY OF THE INVENTION

It is therefore an object of the present invention to propose a protection circuit arranged in a switching power supply system for preventing the switching power supply system from being unceasingly and alternately powered-on and powered-off in an abnormal condition. The switching power supply system provides a supply voltage by using a coupled feedback winding circuit, and has a switching controller having a supply voltage terminal electrically connected to the coupled feedback winding circuit for being powered by the supply voltage. The protection circuit includes a detecting circuit electrically connected to the switching controller for providing a trigger signal when the supply voltage drops to an under-voltage level, and a latch circuit electrically connected to the detecting circuit for providing a latch signal to latch the switching power supply system when the detecting circuit provides the trigger signal to the latch circuit.

According to an aspect of the present invention, the detecting circuit is electrically connected to a reference voltage signal terminal of the switching controller.

Preferably, a reference voltage signal of the reference voltage signal terminal is at a low level when the supply voltage drops to the under-voltage level.

Preferably, the detecting circuit provides the trigger signal to the latch circuit for enabling the latch circuit to latch the switching controller, and causing an output of the switching controller to be set to zero.

Preferably, the detecting circuit includes a transistor having an emitter terminal electrically connected to the reference voltage signal terminal of the switching controller and a collector terminal electrically connected to one terminal of the latch circuit, a first diode having an anode end electrically connected to the reference voltage signal terminal of the switching controller and a cathode end electrically connected to a base terminal of the transistor, and a parallel circuit of a first resistor and a capacitor having one terminal electrically connected to the cathode end of the first diode, and the other terminal electrically connected to ground.

Preferably, the latch circuit has the other terminal for providing the latch signal to latch the switching controller.

Preferably, the detecting circuit includes a field effect transistor (FET) having an source terminal electrically connected to the reference voltage signal terminal of the switching controller and a drain terminal electrically connected to one end of the latch circuit, a first diode having an anode end electrically connected to the reference voltage signal terminal of the switching controller and a cathode end electrically connected to a gate terminal of the field effect transistor, and a parallel circuit of a first resistor and a capacitor having one terminal electrically connected to the cathode end of the first diode, and the other terminal of the parallel circuit electrically connected to ground.

It is therefore another object of the present invention to propose a protection circuit arranged in a switching power supply system for protecting the switching power supply system. The switching power supply system provides a supply voltage by using a coupled feedback winding circuit, and has a switching controller having a supply voltage terminal electrically connected to the coupled feedback winding circuit for being powered by the supply voltage. The protection circuit includes a detecting circuit electrically connected to the switching controller for providing a trigger signal when the supply voltage drops to an under-voltage level, and an auto-recovery protection circuit electrically connected to the detecting circuit for providing an auto-recovery protection to protect the switching power supply system when the detecting circuit provides the trigger signal to the auto-recovery protection circuit.

Preferably, the detecting circuit is electrically connected to a reference voltage signal terminal of the switching controller.

Preferably, a reference voltage signal of the reference voltage signal terminal of the switching controller is at a low level when the supply voltage drops to the under-voltage level.

Preferably, the detecting circuit provides the trigger signal to the auto-recovery protection circuit for enabling the switching power supply system shut-down and the auto-recovery protection circuit to auto-restart the switching power supply system after a restraint time.

Preferably, the detecting circuit includes a transistor having an emitter terminal electrically connected to the reference voltage signal terminal of the switching controller and a collector terminal electrically connected to one terminal of the auto-recovery protection circuit, a first diode having an anode end electrically connected to the reference voltage signal terminal of the switching controller and a cathode end electrically connected to a base terminal of the transistor, and a parallel circuit of a first resistor and a capacitor having one terminal electrically connected to the cathode end of the first diode, and the other terminal electrically connected to ground.

Preferably, the detecting circuit includes a field effect transistor (FET) having an source terminal electrically connected to the reference voltage signal terminal of the switching controller and a drain terminal electrically connected to one end of the auto-recovery protection circuit, a first diode having an anode end electrically connected to the reference voltage signal terminal of the switching controller and a cathode end electrically connected to a gate terminal of the field effect transistor, and a parallel circuit of a first resistor and a capacitor having one terminal electrically connected to the cathode end of the first diode, and the other terminal of the parallel circuit electrically connected to ground.

Preferably, the auto-recovery protection circuit includes a second resistor having one end electrically connected to the drain terminal of the field effect transistor and the other end of the second resistor electrically connected to the supply voltage terminal of the switching controller, and a second diode having a cathode end electrically connected to the drain terminal of the field effect transistor and having an anode end electrically connected to a duty-control feedback voltage terminal of the switching controller.

Preferably, a PWM output of the switching controller is set to zero when the duty-control feedback voltage terminal of the switching controller retained at a low level temporarily by the auto-recovery protection circuit.

Preferably, the restraint time is determined by the first resistor and the capacitor.

It is therefore another object of the present invention to propose a method for protecting a switching power supply system. The switching power supply system provides a supply voltage by using a coupled feedback winding circuit, and has a switching controller having a supply voltage terminal electrically connected to the coupled feedback winding circuit for being powered by the supply voltage and a reference voltage signal terminal $V_{ref}$ providing a reference voltage signal electrically connected to a detecting circuit. The method includes the steps of detecting that the reference voltage signal disappears when the supply voltage is smaller than a minimum of operating voltage and providing a trigger signal, and generating a latch signal to latch the switching power supply system in response to the trigger signal.

It is therefore another object of the present invention to propose a method for protecting a switching power supply system. The switching power supply system provides a supply voltage by using a coupled feedback winding circuit, and has a switching controller having a supply voltage terminal electrically connected to the coupled feedback winding circuit for being powered by the supply voltage and a reference voltage signal terminal providing a reference voltage signal electrically connected to an auto-recovery protection circuit. The method includes the steps of detecting that the reference voltage signal disappears when the supply voltage is smaller than a minimum of operating voltage and providing a trigger signal, and providing an auto-recovery protection to protect the switching power supply system in response to said trigger signal.

The present invention may best be understood through the following description with reference to the accompanying drawings, in which:

DETAILED DESCRIPTION OF THE PREFERRED EMBODIMENT

Figure 1:
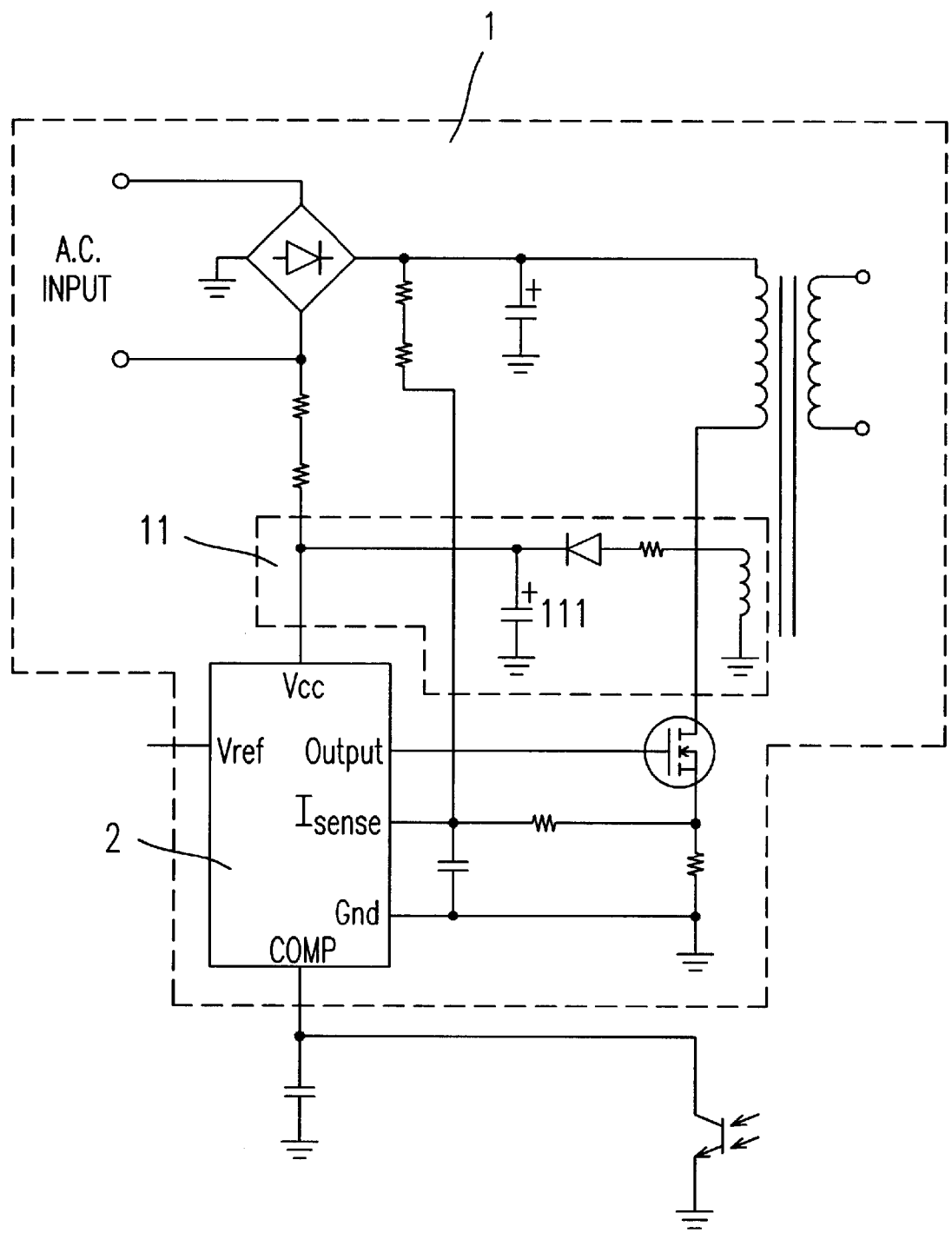
FIG. 1 illustrates a protection circuit for a switching power supply system according to prior art.
Figure 2:
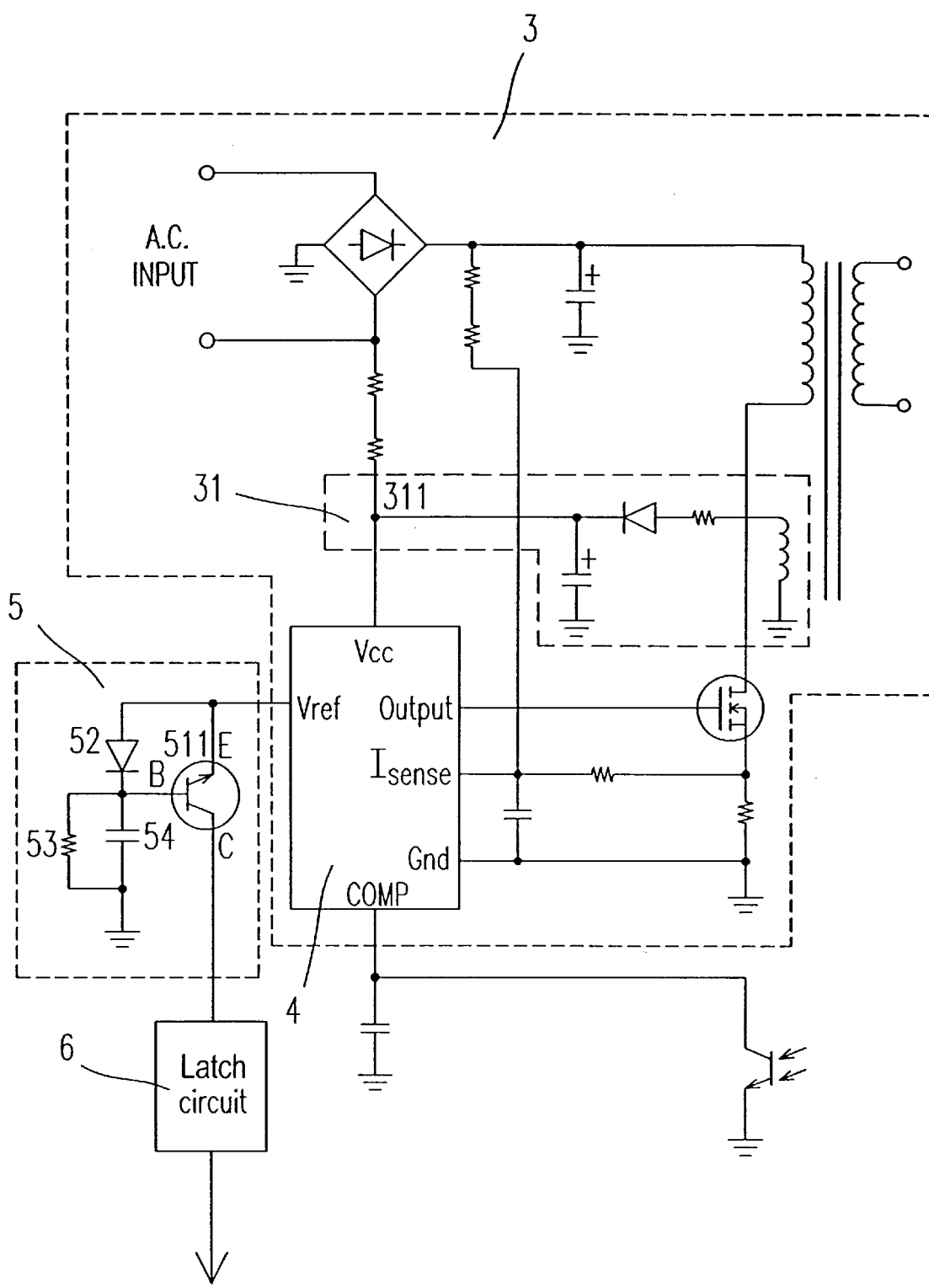
FIG. 2 is a schematic diagram illustrating a protection circuit for a switching power supply system according to the first preferred embodiment of the present invention.

FIG. 2 is a schematic diagram illustrating a protection circuit for a switching power supply system according to the first preferred embodiment of the present invention. As shown in FIG. 2, a protection circuit arranged in a switching power supply system 3 for protecting the switching power supply system 3. The switching power supply system 3 provides a supply voltage at a node 311 by using a coupled feedback winding circuit 31, and has a switching controller 4 having a supply voltage terminal $V_{cc}$ electrically connected to the coupled feedback winding circuit 31 for being powered by the supply voltage. The protection circuit includes a detecting circuit 5 and a latch circuit 6. The detecting circuit 5 is electrically connected to the switching controller 4 for providing a trigger signal when the supply voltage drops to an under-voltage level. Also, a latch circuit 6 is electrically connected to the detecting circuit 5 for providing a latch signal to latch the switching power supply system 3 when the detecting circuit 5 provides the trigger signal to the latch circuit 6.

However, the detecting circuit 5 is electrically connected to a reference voltage signal terminal $V_{ref}$ of the switching controller 4. A reference voltage signal of the reference output voltage signal terminal $V_{ref}$ is at a low level when the supply voltage $V_{cc}$ drops to the under-voltage level. The detecting circuit 5 provides the trigger signal to the latch circuit 6 for enabling the latch circuit 6 to latch the switching controller 4, and causing an output of the switching controller 4 to be set to zero.

Meanwhile, the detecting circuit 5 includes a transistor 511, a first diode 52, and a parallel circuit of a first resistor 53 and a capacitor 54. The transistor 511 has an emitter terminal E electrically connected to the reference voltage signal terminal $V_{ref}$ of the switching controller 4 and a collector terminal electrically connected to one terminal of the latch circuit 6. The first diode 52 has an anode end electrically connected to the reference voltage signal terminal $V_{ref}$ of the switching controller 4, and a cathode end of the first diode 52 is electrically connected to a base terminal B of the transistor 511. The parallel circuit of the first resistor 53 and the capacitor 54 has one terminal electrically connected to the cathode end of the first diode 52, and the other terminal is electrically connected to ground. The latch circuit 6 has the other terminal for providing the latch signal to latch the switching controller 4.

Figure 3:
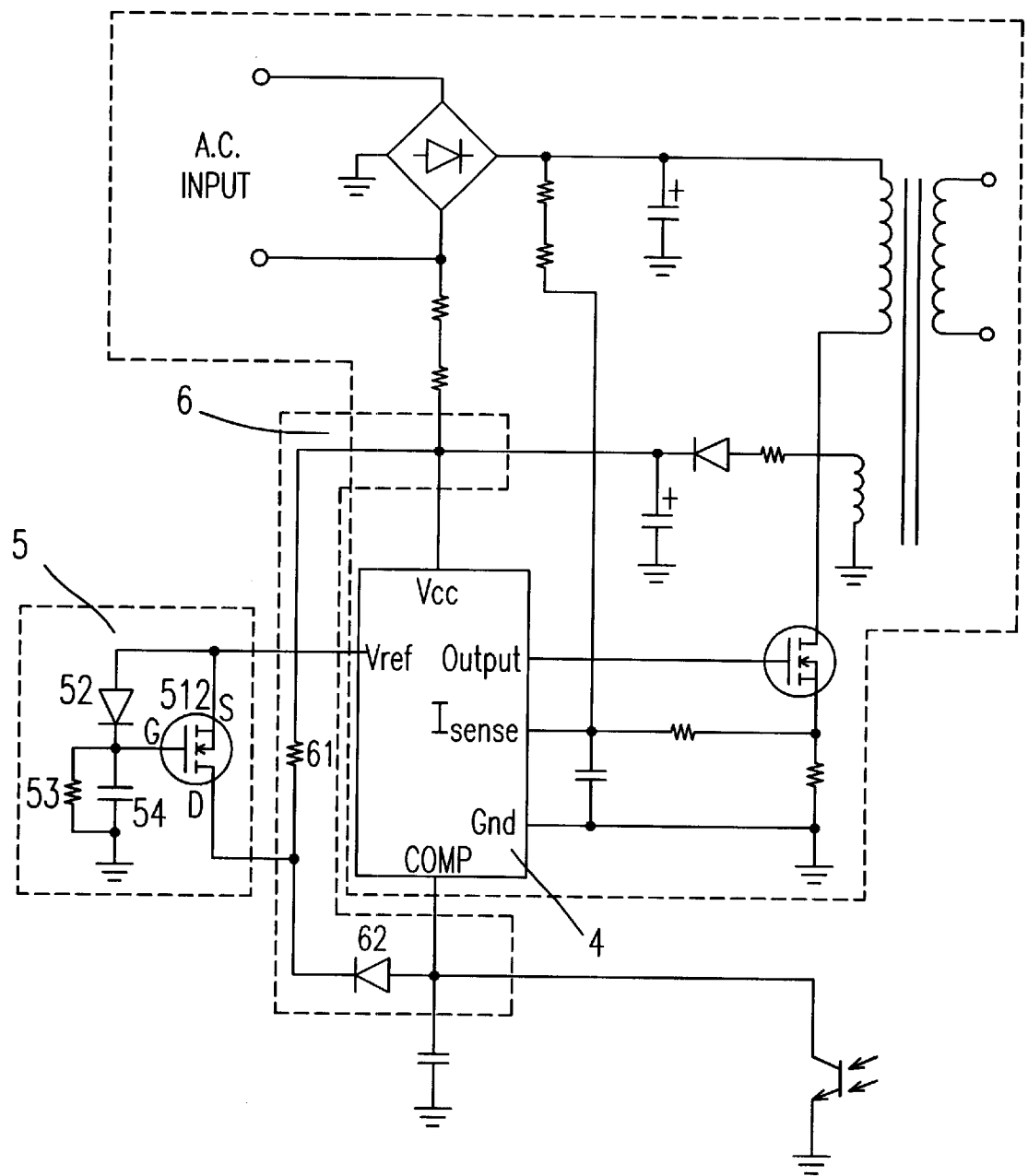
FIG. 3 is a schematic diagram illustrating a protection circuit for a switching power supply system according to the second preferred embodiment of the present invention.

FIG. 3 is a schematic diagram illustrating a protection circuit for a switching power supply system according to the second preferred embodiment of the present invention. As shown in FIG. 3, the detecting circuit 5 includes a field effect transistor (FET) 512, a first diode 52, and a parallel circuit of a first resistor 53 and a capacitor 54. The field effect transistor 512 has a source terminal S electrically connected to the reference voltage signal terminal $V_{ref}$ of the switching controller 4 and a drain terminal D electrically connected to one end of the latch circuit 6. The first diode 52 has an anode end electrically connected to the reference voltage signal terminal $V_{ref}$ of the switching controller 4, and a cathode end of the first diode 52 is electrically connected to a gate terminal G of the field effect transistor 512. A parallel circuit of a first resistor 53 and a capacitor 54 has one terminal electrically connected to the cathode end of the first diode 52, and the other terminal of the parallel circuit is electrically connected to ground. The switching controller is a PWM controller. The PWM controller is preferably the industry standard 3842/3843 family of PWM controller. The auto-recovery protection circuit 6 includes a second resistor 61 and a second diode 62. The second resistor 61 has one end electrically connected to the drain terminal D of the field effect transistor 512, and the other end of the second resistor 61 is electrically connected to the supply voltage terminal $V_{cc}$ of the switching controller 4. Also, the second diode 62 has a cathode end electrically connected to the drain terminal D of the field effect transistor 512, and an anode end of the second diode 62 is electrically connected to a duty-control feedback voltage terminal COMP of the switching controller 4. The reference voltage signal disappears when the supply voltage is smaller than a minimum of operating voltage. Owing to the reference voltage signal is at a low level, the field effect transistor (FET) 512 is turned on. Thus, the second diode 62 is turned on. A voltage at the duty-control feedback voltage terminal COMP of the switching controller 4 is set to a low level and the supply voltage is discharged through the second resistor 61 and the field effect transistor 512. Therefore, the PWM output of the switching controller 4 is set to zero when a voltage at the duty-control feedback voltage terminal COMP of the switching controller 4 retained at a low level. The switching controller 4 is shut down and enter an auto-recovery mode. When the reference voltage signal of the reference voltage signal terminal $V_{ref}$ is at a low level, charges stored in the capacitor 54 are discharged through the resistor 53. A restraint time is determined by the capacitor 54 and the first resistor 53. Until a voltage of the capacitor 54 is at a low level, the field effect transistor (FET) 512 is turned off The switching power supply system is auto-restarted.

Figure 4:
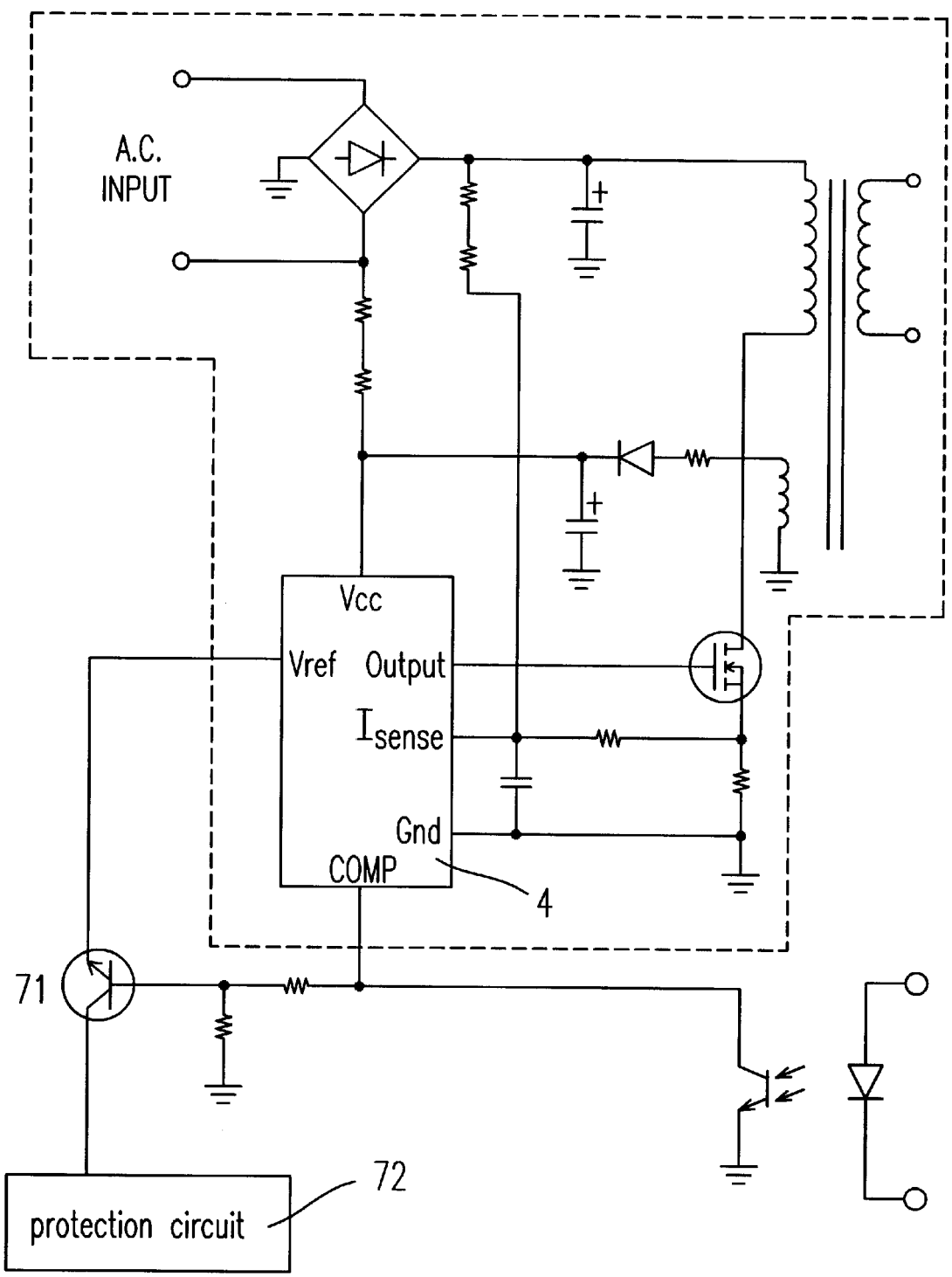
FIG. 4 is a schematic diagram illustrating a protection circuit for a switching power supply system according to the third preferred embodiment of the present invention.

FIG. 4 is a schematic diagram illustrating a protection circuit for a switching power supply system according to the third preferred embodiment of the present invention. As shown in FIG. 4, if an abnormal condition occurs, the disappearance of the reference voltage signal terminal $V_{ref}$ will enable a transistor 71 to generate a signal. The signal can trigger the protection circuit 72 (i.e. the latch circuit or the auto-recovery protection circuit) to protect the switching power supply system.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A protection circuit arranged in a switching power supply system for protecting said switching power supply system, wherein said switching power supply system provides a supply voltage by using a coupled feedback winding circuit, and has a switching controller having a supply voltage terminal electrically connected to said coupled feedback winding circuit for being powered by said supply voltage, comprising:

a detecting circuit electrically connected to said switching controller for providing a trigger signal when said supply voltage drops to an under-voltage level; and a latch circuit electrically connected to said detecting circuit for providing a latch signal to latch said switching power supply system when said detecting circuit provides said trigger signal to said latch circuit in a manner to avoid said switching controller from being unceasingly and alternately powered-on and powered-off.

2. The protection circuit according to claim 1, wherein said detecting circuit is electrically connected to a reference voltage signal terminal of said switching controller.

3. The protection circuit according to claim 2, wherein a reference voltage signal of said reference voltage signal terminal is at a low level when said supply voltage drops to said under-voltage level.

4. The protection circuit according to claim 3, wherein said detecting circuit provides said trigger signal to said latch circuit for enabling said latch circuit to latch said switching controller, and causing an output of said switching controller to be set to zero.

5. The protection circuit according to claim 4, wherein said detecting circuit comprises:

a transistor having an emitter terminal electrically connected to said reference voltage signal terminal of said switching controller and a collector terminal electrically connected to one terminal of said latch circuit;

a first diode having an anode end electrically connected to said reference voltage signal terminal of said switching controller and a cathode end electrically connected to a base terminal of said transistor; and a parallel circuit of a first resistor and a capacitor having one terminal electrically connected to said cathode end of said first diode, and said other terminal electrically connected to ground.

6. The protection circuit according to claim 5, wherein said latch circuit has said other terminal for providing said latch signal to latch said switching controller.

7. The protection circuit according to claim 4, wherein said detecting circuit comprises:

a field effect transistor (FET) having an source terminal electrically connected to said reference voltage signal terminal of said switching controller and a drain terminal electrically connected to one end of said latch circuit;

a first diode having an anode end electrically connected to said reference voltage signal terminal of said switching controller and a cathode end electrically connected to a gate terminal of said field effect transistor; and a parallel circuit of a first resistor and a capacitor having one terminal electrically connected to said cathode end of said first diode, and said other terminal of said parallel circuit electrically connected to ground.

8. A protection circuit arranged in a switching power supply system for protecting said switching power supply system, wherein said switching power supply system provides a supply voltage by using a coupled feedback winding circuit, and has a switching controller having a supply voltage terminal electrically connected to said coupled feedback winding circuit for being powered by said supply voltage, comprising:

a detecting circuit electrically connected to said switching controller for providing a trigger signal when said supply voltage drops to an under-voltage level; and an auto-recovery protection circuit electrically connected to said detecting circuit for providing auto-recovery protection to protect said switching power supply system by disabling said switching power supply system in a manner to avoid said switching controller from being unceasingly and alternately powered-on and powered-off when said detecting circuit provides said trigger signal to said auto-recovery protection circuit and thereafter auto-enabling said switching power supply system.

9. The protection circuit according to claim 8, wherein said detecting circuit is electrically connected to a reference voltage signal terminal of said switching controller.

10. The protection circuit according to claim 9, wherein a reference voltage signal of said reference voltage signal terminal of said switching controller is at a low level when said supply voltage drops to said under-voltage level.

11. The protection circuit according to claim 10, wherein said detecting circuit provides said trigger signal to said auto-recovery protection circuit for enabling said switching power supply system shut-down and said auto-recovery protection circuit to auto-restart said switching power supply system after a restraint time.

12. The protection circuit according to claim 11, wherein said detecting circuit comprises:
   a transistor having an emitter terminal electrically connected to said reference voltage signal terminal of said switching controller and a collector terminal electrically connected to one terminal of said auto-recovery protection circuit;
   a first diode having an anode end electrically connected to said reference voltage signal terminal of said switching controller and a cathode end electrically connected to a base terminal of said transistor; and
   a parallel circuit of a first resistor and a capacitor having one terminal electrically connected to said cathode end of said first diode, and said other terminal electrically connected to ground.

13. The protection circuit according to claim 12, wherein said detecting circuit comprises:
   a field effect transistor (FET) having an source terminal electrically connected to said reference voltage signal terminal of said switching controller and a drain terminal electrically connected to one end of said auto-recovery protection circuit;
   a first diode having an anode end electrically connected to said reference voltage signal terminal of said switching controller and a cathode end electrically connected to a gate terminal of said field effect transistor; and
   a parallel circuit of a first resistor and a capacitor having one terminal electrically connected to said cathode end of said first diode, and said other terminal of said parallel circuit electrically connected to ground.

14. The protection circuit according to claim 13, wherein said auto-recovery protection circuit comprises:
   a second resistor having one end electrically connected to said drain terminal of said field effect transistor and said other end of said second resistor electrically connected to said supply voltage terminal of said switching controller; and
   a second diode having a cathode end electrically connected to said drain terminal of said field effect transistor and having an anode end electrically connected to a duty-control feedback voltage terminal of said switching controller.

15. The protection circuit according to claim 14, wherein a PWM output of said switching controller is set to zero when said duty-control feedback voltage terminal of said switching controller retained at a low level temporarily by said auto-recovery protection circuit.

16. The protection circuit according to claim 14, wherein said restraint time is determined by said first resistor and said capacitor.

17. A method for protecting a switching power supply system, wherein said switching power supply system provides a supply voltage by using a coupled feedback winding circuit, and has a switching controller having a supply voltage terminal electrically connected to said coupled feedback winding circuit for being powered by said supply voltage and a reference voltage signal terminal providing a reference voltage signal electrically connected to a detecting circuit, comprising the steps of:
   detecting that said reference voltage signal disappears when said supply voltage is smaller than a minimum of operating voltage and providing a trigger signal; and
   generating a latch signal to latch said switching power supply system in response to said trigger signal in a manner to avoid said switching controller from being unceasingly and alternately powered-on and powered-off.

18. A method for protecting a switching power supply system, wherein said switching power supply system provides a supply voltage by using a coupled feedback winding circuit, and has a switching controller having a supply voltage terminal electrically connected to said coupled feedback winding circuit for being powered by said supply voltage and a reference voltage signal terminal providing a reference voltage signal electrically connected to an auto-recovery protection circuit, comprising the steps of:
   detecting that said reference voltage signal disappears when said supply voltage is smaller than a minimum of operating voltage and providing a trigger signal; and
   providing auto-recovery protection to protect said switching power supply system in response to said trigger signal by disabling said switching power supply system in a manner to avoid said switching controller from being unceasingly and alternately powered-on and powered-off and thereafter auto-enabling said switching power supply system.

19. The method according to claim 18 wherein said auto-recovery protection is used by disabling said switching power supply system and then auto-enabling said switching power supply system after a selected time period.

20. The protection circuit according to claim 19 wherein said time period is determinable by a designer.

* * * * *